US007200685B2

(12) United States Patent
Uemura

(10) Patent No.: US 7,200,685 B2
(45) Date of Patent: Apr. 3, 2007

(54) COMMUNICATION APPARATUS FOR COMMUNICATING DATA BETWEEN SEPARATE TOPLOGIES, AND RELATED METHOD, STORAGE MEDIUM, AND PROGRAM

(75) Inventor: Hiroshi Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 10/411,324

(22) Filed: Apr. 11, 2003

(65) Prior Publication Data

US 2003/0204661 A1   Oct. 30, 2003

(30) Foreign Application Priority Data

Apr. 16, 2002 (JP) ............... 2002-113632
Apr. 1, 2003 (JP) ............... 2003-098209

(51) Int. Cl.
*G06F 3/00* (2006.01)
*G06F 13/00* (2006.01)
*G06F 13/40* (2006.01)

(52) U.S. Cl. .................. 710/2; 710/3; 710/8; 710/100; 710/300

(58) Field of Classification Search .................... 710/2, 710/3, 62, 300, 105
See application file for complete search history.

(56) References Cited

U.S. PATENT DOCUMENTS

| 5,784,581 | A * | 7/1998 | Hannah | 710/110 |
| 6,148,358 | A * | 11/2000 | Murai | 710/2 |
| 6,549,966 | B1 * | 4/2003 | Dickens et al. | 710/53 |
| 6,601,109 | B1 * | 7/2003 | Bealkowski et al. | 710/105 |
| 2003/0196011 | A1 * | 10/2003 | Shih | 710/62 |

* cited by examiner

*Primary Examiner*—Kim Huynh
*Assistant Examiner*—Joshua D. Schneider
(74) *Attorney, Agent, or Firm*—Fitzpatrick, Cella, Harper & Scinto

(57) ABSTRACT

In a connection form of PC-printer-digital camera, for example, to enable a printing function from a PC to a printer, a direct printing function from a digital camera to a printer, and a function of directly transferring image data on a memory card of the digital camera to storage means on the PC, without changing the connection of each device, a printer comprises a virtual USB function which receives data from a PC directly connected via a communication line, a USB host which requests a digital camera also directly connected via the communication line for a data transfer and obtains data, a USB function capable of inputting and outputting the data received by the virtual USB function and the data obtained by the USB host, respectively, and a virtual USB function which transfers the data obtained from the digital camera to the PC.

18 Claims, 7 Drawing Sheets

COMMUNICATION APPARATUS FOR COMMUNICATING DATA BETWEEN SEPARATE TOPLOGIES, AND RELATED METHOD, STORAGE MEDIUM, AND PROGRAM

BACKGROUND OF THE INVENTION

1. Field of the Invention

The present invention relates to a communication method associated with data transfer when directly connecting an information processing apparatus such as a computer and a peripheral device such as a digital camera or a printer via a communication line.

2. Description of the Related Art

Recently, since performance is improved and cost is decreasing in image input devices such as a digital camera and, and higher definition is achieved in recording devices such as a printer, a desire has been increasing for a direct printer capable of directly connecting the image input device and the recording device without passing through a host information processing apparatus such as a personal computer, and outputting images in the image input device.

A USB (Universal Serial Bus) interface, often adopted as means for connecting these devices, is an interface specification universal to various kinds of peripheral devices, which can connect a maximum of 127 devices in a daisy chain mode using the same connector. The USB further comprises a function called plug and play which allows connections of devices while a power source of the computer is turned on. The USB is constituted of a USB host and USB devices, and the USB devices include a USB function and a USB hub.

The USB function is a USB device capable of transmitting and receiving data and control information by way of a USB bus, and includes an input device such as a key board, an output device such a printer, and the like. The USB hub is a device for increasing connection points of the USB. The USB host exchanges information with the USB devices via a host controller, and manages the connected USB devices.

In order to perform printing from the PC via the USB, the PC and printer are connected as shown in FIG. 8. Further, a memory card compliant with PCMCIA such as a CompactFlash® card or smart media is often used as storage means for image data in the image input device such as a digital camera 803, and many of users who have a PC 802 connect the digital camera 803 to the PC 802 for the processing of the image data taken by the digital camera by means of photo retouching software or the like, thereby copying the image data stored in the memory card onto storage means such as a hard disk on the PC 802. Thus, the digital camera 803 is also connected to the PC 802, so that the connection of the devices will take a form of printer-PC-digital camera, as shown in FIG. 8.

However, since the digital camera 803 and printer 801 are both connected to the PC 802 and are not connected directly to each other, direct printing can not be performed from the digital camera 803 to the printer 801.

Furthermore, to enable the direct printing from the digital camera, a direct printer and the digital camera are directly connected via the USB. However, as the PC is not connected in this connection form, the data on the memory card of the digital camera can not be transferred to the PC.

Thus, in the connection form of printer-PC-digital camera, direct printing can not be performed from the digital camera to the printer, so that in the conventional connection form of direct printer-digital camera, the image data on the memory card of the digital camera can not be transferred directly to the storage means on the PC. Therefore, the connection of each device needs to be changed in each case, which causes trouble.

Especially in the USB, each network topology has one host, and the host device controls communication in the topology, but communication can not be performed between different network topologies.

Thus, when the PC, printer and digital camera are connected as above so that the printer functions as the host for the digital camera, two network topologies of PC-printer and printer-digital camera are formed, which does not allow the data transfer to the digital camera under the control of PC.

SUMMARY OF THE INVENTION

An object of the present invention is to solve all or at least one of the problems described above.

Furthermore, a feature of the present invention is to enable communication between different network topologies.

Still further, another feature of the present invention is aimed at achieving, for example, in a connection form of PC-printer-digital camera, a printing function from a PC to a printer, a direct printing function from a digital camera to a printer, and a function of directly transferring image data on a memory card of the digital camera to storage means on the PC, without changing the connection of each device.

In order to realize the above features, the present application discloses a communication apparatus for communicating data between separate topologies, comprising:

a first communication interface which forms a first topology with a first external device;

a second communication interface which forms a second topology with a second external device;

specifying means for virtually specifying said second device in said first topology; and transfer means for transferring information, which is sent to said virtual second device specified by said specifying means from said first device in said first topology, to said second device in said second topology.

Still another object and feature of the present invention will become apparent from the following embodiments and description of the drawings.

DETAILED DESCRIPTION OF THE PREFERRED EMBODIMENTS

Embodiments of the present invention will hereinafter be described in detail in reference to the accompanying drawings.

Figure 1:
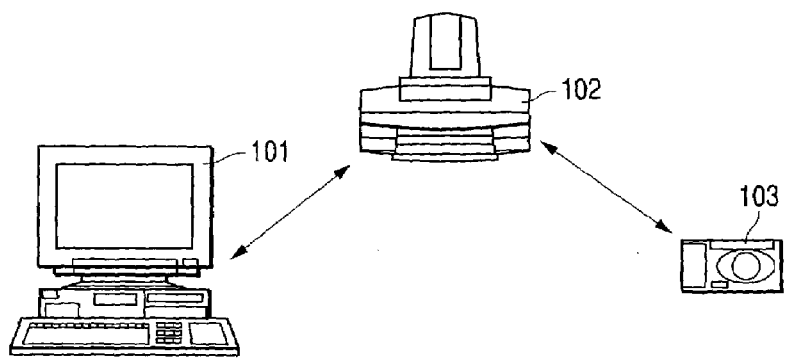
FIG. 1 is a view showing a schematic configuration of a data transfer system according to one embodiment of the present invention.

FIG. 1 is a view showing a schematic configuration of a data transfer system according to one embodiment of the present invention. As shown in FIG. 1, the data transfer system according to the present embodiment has a connection form of PC 101-direct printer 102-digital camera 103.

Figure 9:
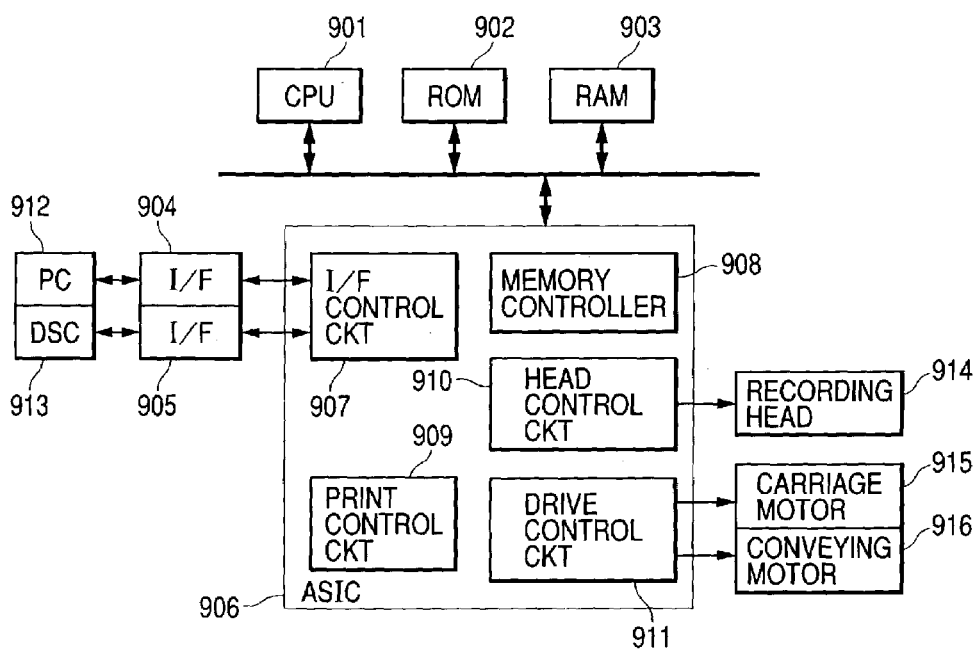
FIG. 9 is a view representing an overview of the configuration of a direct printer 102.

FIG. 9 is a view representing an overview of the configuration of the direct printer 102. In the drawing, the reference numeral 901 is a CPU, and 902 is a ROM storing a control program executed by the CPU 901, other table data and the like. 903 is a RAM, which is allocated to an area for a receiving buffer which stores data received via an interface (I/F) 904 from a host computer (PC) 912, an area for a print buffer which stores print data generated by a print control circuit 909 described later, and the like, and further allocated to a buffer area used when a data transfer is performed with a digital camera (DSC) 913 via an interface (I/F) 905. 906 is a direct printer control unit in the form of an ASIC (Application Specific Integrated Circuit), which comprises an I/F control circuit 907 for transmitting and receiving data to and from the PC and DSC via the I/Fs 904 and 905, a memory controller 908 for performing data read/write controls on the RAM 903, the print control circuit 909 for generating print data, a head control circuit 910 for transferring print data to a recording head 914 and performing ink discharge control on the recording head 914, and a drive control circuit 911 which controls the driving of a carriage motor 915 for scanning a carriage equipped with the recording head 914 scan and the driving of a conveying motor 916 for feeding and delivering (operating) recorded media.

Figure 10:
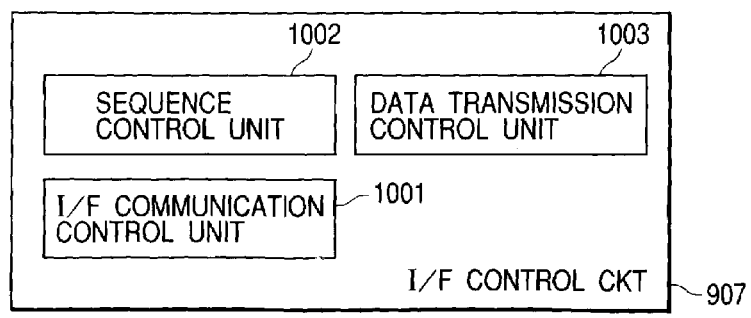
FIG. 10 is a view representing the configuration of an I/F control circuit 907 according to the present embodiment.

Furthermore, FIG. 10 is a view representing the configuration of the I/F control circuit 907 according to the present embodiment. An I/F communication control unit 1001 communicates with the PC 912 or DSC 913 connected to the I/Fs 904 and 905 depending on the state of devices. A sequence control unit 1002 performs sequence control of the data transfer between a first virtual USB function 207 (described later) and a USB function 211 and the data transfer between a second virtual USB function 208 (described later) and a USB function 212, in relation to the data transferred from the PC 912 or DSC 913 via the I/Fs 904 and 905. A data transmission control unit 1003 controls the transfer of data, which the virtual USB function transmits and receives to and from a PC 201 (PC 901), to the RAM 903 so as to achieve the data transfer between the virtual USB function and the USB function.

The virtual USB function will be described later in detail.

Figure 2:
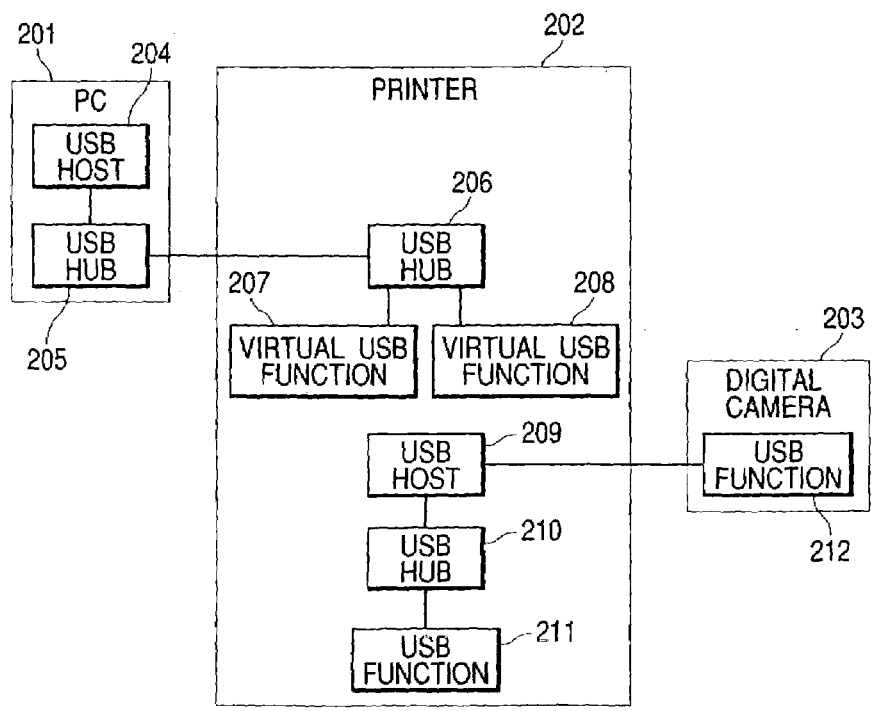
FIG. 2 is a view showing a connection form of USBs of the data transfer system according to one embodiment of the present invention.

FIG. 2 is a view showing the connection of the USBs in the connection form of the PC 101-direct printer 102-digital camera 103 of FIG. 1.

The PC 201 comprises a USB host 204 and a hub 205. A direct printer 202 comprises a first hub 206 connected to the PC 201, the first virtual USB function 207 and second virtual USB function 208 which can be seen as if they are actual USB functions from the USB host 204 of the PC 201, a USB host 209 for transferring data with the USB function 212 of a digital camera 203 described later, a hub 210 connected to the USB host 209, and the USB function 211.

Here, the USB hub 206, the first virtual USB function 207 and second virtual USB function 208, the USB host 209, the USB hub 210, and the USB function 211 are included in the I/F communication control unit 1001 described above, and actually communicate with the PC 201 and digital camera 203.

The digital camera 203 comprises the USB function 212.

Figure 3A:
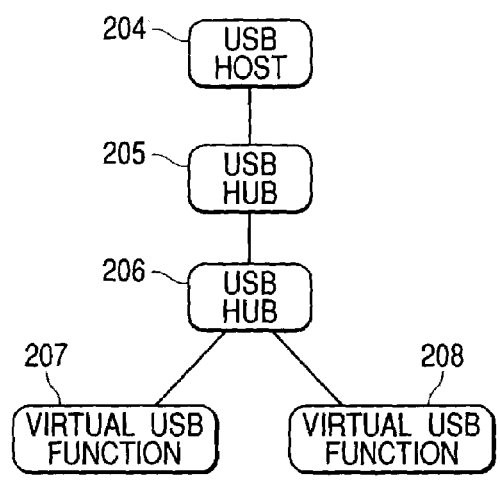
FIGS. 3A and 3B are views showing USB bus topologies of the data transfer system according to one embodiment of the present invention.

Thus, a first topology is constituted by the USB host 204 and hub 205 of the PC 201, and the first hub 206, the first virtual USB function 207 and second virtual USB function 208 of the direct printer 202, as shown in FIG. 3A.

Figure 3B:
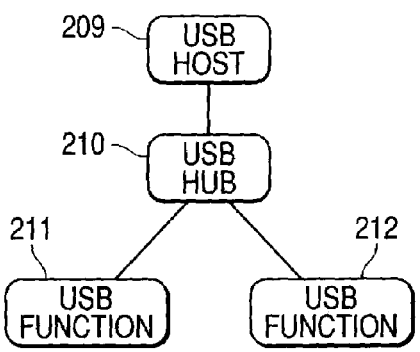

Furthermore, as shown in FIG. 3B, the USB host 209, second hub 210 and USB function 211 of the direct printer 202, and the USB function 212 of the digital camera 203 constitute a second topology. Here, the first virtual USB function 207 and second virtual USB function 208, which are the feature of the present invention, behave in the same manner as the USB function 211 of the direct printer 202 and the USB function 212 of the digital camera 203, respectively, regarding the USB host 204 of the PC 201.

"Behave in the same manner" mentioned here refers to the following.

In the present embodiment, the USB function 211 in the direct printer 202 is a function of a printing class, and is constituted of three end points. An end point 0 supports control transfer, an end point 1 supports bulk-out transfer, and an end point 2 supports bulk-in transfer. The USB function 212 in the digital camera 203 is of a mass storage class, and is constituted of four end points. An end point 0 supports control transfer, an end point 1 supports bulk-in transfer, an end point 2 supports bulk-out transfer, and an end point 3 supports interrupt transfer.

Furthermore, the first virtual USB function 207 in the direct printer has a device class and end point constitution equivalent to those of the USB function 211.

Therefore, when the USB host 204 transmits and receives data via each end point of the first virtual USB function 207, it seems as if the USB host 204 is communicating with the USB function 211.

On the other hand, the second virtual USB function 208 has a device class and end point constitution equivalent to those of the USB function 212. Therefore, when the USB host 204 transmits and receives data via each end point of the second virtual USB function 208, it seems as if the USB host 204 is communicating with the USB function 212.

Figure 11:
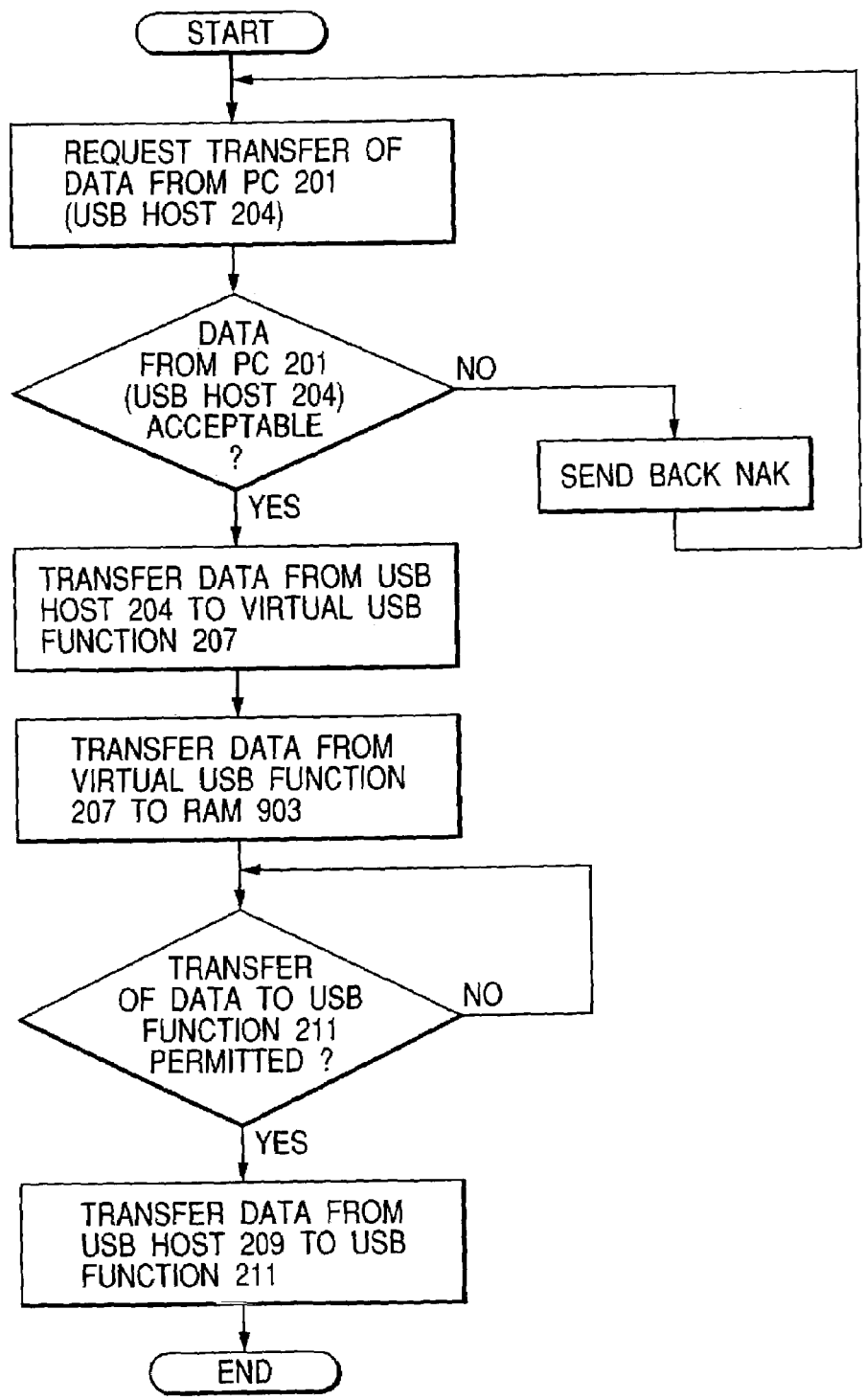
FIG. 11 is a flowchart in the case of carrying out a data transfer when printing is performed from the PC.

When printing is performed from the PC 201 (e.g., see FIG. 11), data is first transferred from the USB host 204 of the PC 201 to the first virtual USB function 207 which corresponds to the USB function 211 of the direct printer 202, in the first USB topology. At this time, the first virtual USB function 207 behaves in the same manner as the USB function 211 of the direct printer 202 regarding the USB host 204, and transmits and receives data to and from the USB host 204. More specifically, since the first virtual USB function 207 has the end points constituted similarly to those of the USB function 211, a transfer of print data from the PC 201 to the direct printer 202 can be achieved by the bulk-out transfer to the first virtual USB function 207 by the USB host 204.

At this time, the data transferred from the PC 201 is temporarily stored in the RAM 903 by the data transmission control unit 1003.

However, when a print request from the PC 201 can not be accepted, for example, when the direct printer 202 is performing a printing operation from the digital camera 203, the sequence control unit 1002 outputs a signal indicating that data can not be accepted, to the first virtual USB function 207. Receiving this signal, the first virtual USB function 207 sends back a handshake packet of NAK against the bulk-out transfer from the PC so as to indicate that the data from the PC 201 can not be received.

Next, the sequence control unit 1002 recognizes that the data stored in the RAM 903 is the data to be transferred to the USB function 211 (print data from the PC 201), so that at the time when a predetermined amount of data is stored in the RAM 903, the sequence control unit 1002 permits the transfer to the USB function 211. Upon receiving this, the USB host 209 of the direct printer 202, in the second USB topology, transfers the data stored in the RAM 903 to the end point 1 of the USB function 211. The received data transferred to the USB function 211 is stored in the receiving buffer in the RAM 903 by the memory controller 908. At the moment when the predetermined amount of data is stored, the print data control circuit 909 generates print data, which is stored in the print buffer in the RAM 903 by the memory controller 908. The head control circuit 910 reads the print data from the print buffer at predetermined timing, and transfers it to the recording head 914. Further, the head control circuit 910 applies a driving pulse to the recording head 914 in a process of main scanning by the recording head, whereby an actual print operation is performed and an image is formed. Scanning by the recording head 914 and conveyance of the recorded media are carried out by driving the carriage motor 915 and conveying motor 916 by the drive control circuit 911.

In this way, the data transfer between the USB host 204 of the PC 201 and the USB function 211 of the direct printer 202 is carried out via the first virtual USB function 207 in the I/F communication control unit 1001, thereby enabling the data transferred from the PC 201 to be printed.

Thus, communication between different network topologies is possible.

It should be noted that in the USB, a different address is assigned to each USB function so as to identify each communication device in the topology.

Thus, there is a possibility that the address assigned to the virtual USB function 208 in the topology between the PC and printer and the address assigned to the USB function 212 in the topology between the printer and digital camera is different.

At that case, by recognizing and converting the address specifying information, the interface communication control unit 1001 can also solve the inconsistency of addresses assigned to the functions having an equivalent function in different topologies.

When direct printing is performed from the digital camera 203 to the direct printer 202, the USB host 209 of the direct printer 202, in the second USB topology, requests the USB function 212 of the digital camera 203 for a data transfer so as to take in the data, and thereafter transfers the data to the USB function 211 to execute printing.

The USB host 209 requests the data by bulk-in transfer via the end point 1 of the USB function 212 in the digital camera 203. The digital camera 203 transmits the data to the USB host 209 in response to the request. The data received by the USB host 209 is stored in the receiving buffer in the RAM 903. After that, printing is achieved by the same processing as when printing is performed from the PC 201.

Figure 12:
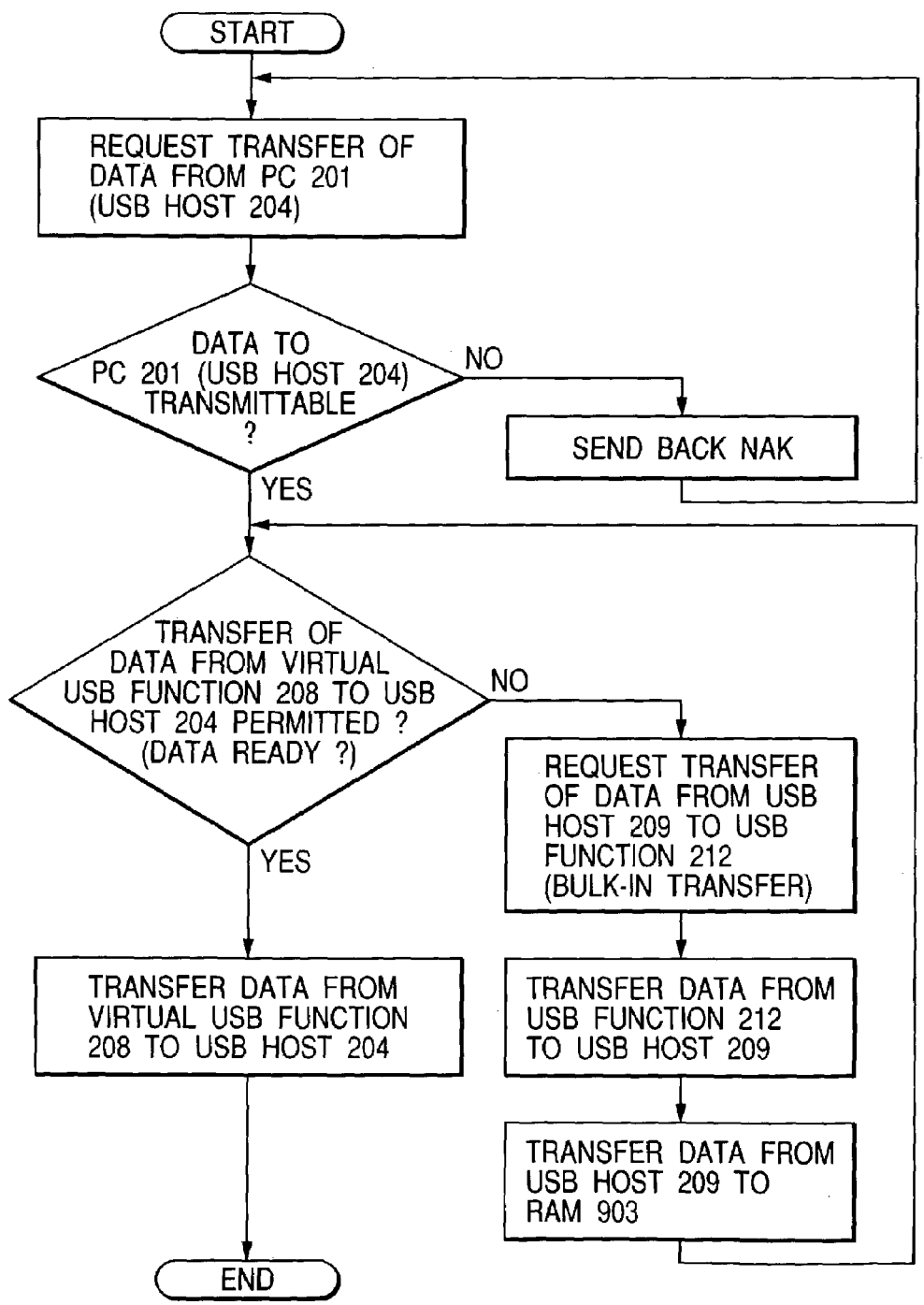
FIG. 12 is a flowchart when a data transfer is carried out between the PC and the digital camera.

When the image data in the digital camera 203 is transferred to the PC 201 (e.g., see FIG. 12), a data transfer is first requested, in the first USB topology, from the USB host 204 of the PC 201 to the second virtual USB function 208 corresponding to the USB function 212 of the digital camera 203.

More specifically, since the second virtual USB function 208 has the end points constituted similarly to those of the USB function 212, the data transfer request from the PC 201 to the digital camera 203 can be achieved by bulk-in transfer to the second virtual USB function 208 by means of the USB host 204.

At this time, when access to the digital camera 203 from the PC 201 can not be accepted, for example, when the direct printer 202 is performing a printing operation from the digital camera 203, the sequence control unit 1002 outputs a signal indicating that data can not be transmitted, to the second virtual USB function 208. Receiving this signal, the second virtual USB function 208 sends back a handshake packet of NAK against the bulk-in transfer from the PC so as to indicate that the data can not be transmitted to the USB host 204 of the PC 201. In the case where transmission is possible, if the second virtual USB function 208 is ready for the data to be transmitted in response to the data transfer request from the USB host 204, the sequence control unit 1002 outputs a data transfer permitting signal. If it is not ready, the transfer permitting signal is not output, and the USB host 209 of the direct printer 202 in the second USB topology requests the USB function 212 of the digital camera 203 for a data transfer so as to take in the data.

More specifically, the USB host 209 makes a bulk-in transfer request to the USB function 212 of the digital camera 203. The USB function 212 transfers the data by bulk-in transfer to the USB host 209 in response to the transfer request. The data transferred to the USB host 209 is temporarily stored in the RAM 903. At the time when the data is ready, the sequence control unit 1002 outputs a data transfer permitting signal. In response to this, the second virtual USB function 208 transfers the data to the USB host 204.

In this way, the data transfer between the USB host 204 of the PC 201 and the USB function 212 of the digital camera 203 can be achieved via the second virtual USB function 208 of the direct printer 202.

As described above, according to the present invention, with the first USB topology and the second USB topology, the data transfer between the USB host of the first USB topology and the USB function of the second USB topology is achieved via the virtual USB functions, thereby enabling the printing function from the PC to the printer, the direct printing function from the digital camera to the printer and the function of directly transferring the image data on the memory card of the digital camera to storage means on the PC to be effected without changing the connection of each device from the connection form of PC-printer-digital camera.

It should be noted that in the description above, other classes such as an image class and movie class are also applicable like the device class of the USB.

Figure 4:
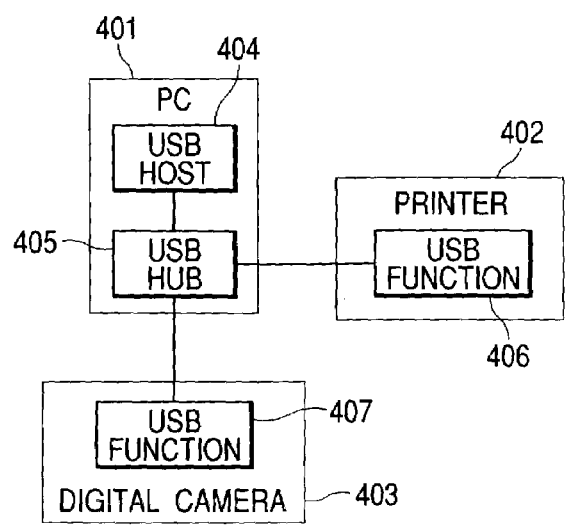
FIG. 4 is a view showing a concrete example of a connection form of printer-PC-digital camera which the present inventor has devised.
Figure 5:
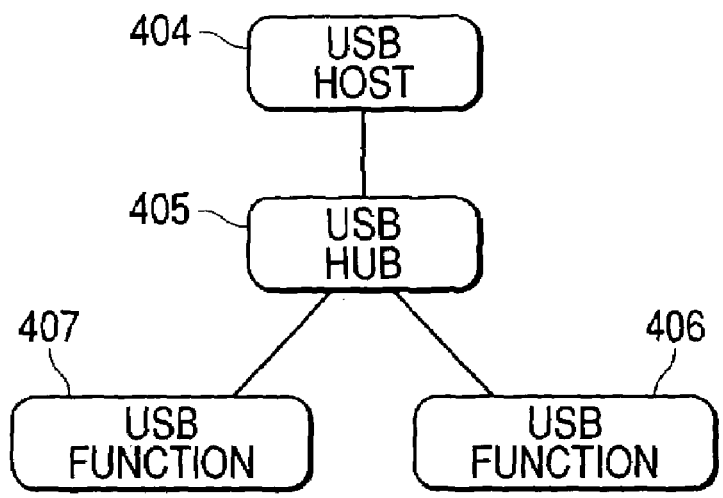
FIG. 5 is a view showing the bus topology in the connection form of printer-PC-digital camera which the present inventor has devised.

FIG. 4 is a view showing a concrete example of the connection form of printer-PC-digital camera which the present inventor has devised. A PC 401 comprises a USB host 404 and a hub 405, a USB function 406 of a printer 402 and a USB function 407 of a digital camera 403 are constituted to be connected to a downstream port of the hub 405, and constitute a USB bus topology as shown in FIG. 5.

When printing is performed from the PC 401, data is transferred from the USB host 404 of the PC 401 to the USB function 406 of the printer 402 via the hub 405 so as to perform the printing. When data is transferred from a memory card of the digital camera 403 to the PC 401, the USB host 404 of the PC 401 requests the USB function 407 of the digital camera 403 for a transfer via the hub 405 so as to take in the data.

Figure 6:
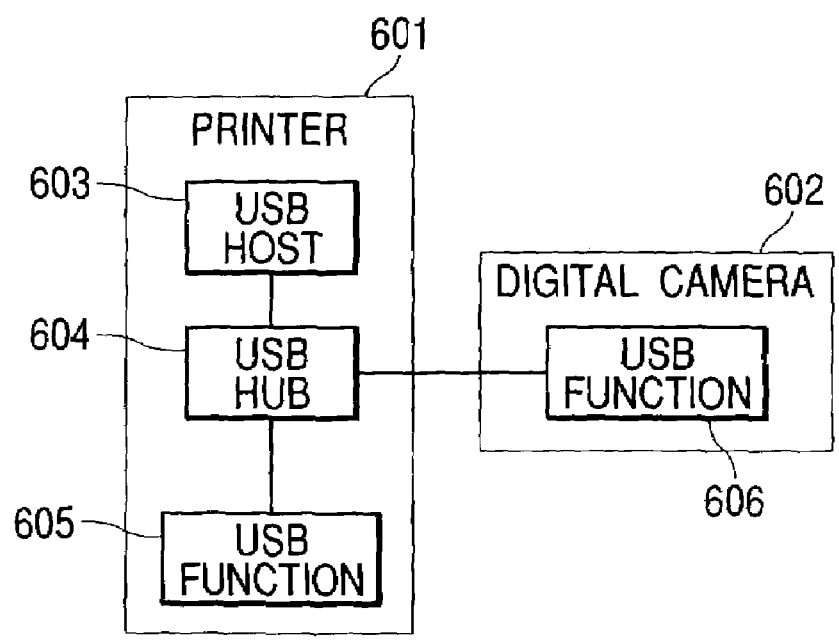
FIG. 6 is a view showing a concrete example of a connection form of direct printer-digital camera which the present inventor has devised.

Furthermore, FIG. 6 is a view showing a concrete example of the connection form of direct printer-digital camera which the present inventor has similarly devised. As shown in FIG. 6, a direct printer 601 and a digital camera 602 are connected via the USB, and the direct printer 601 comprises a USB host 603, a hub 604 and a USB function 605 equivalent to the USB function 406. The digital camera 602 comprises a USB function 606 equivalent to the USB function 407, and is constituted to be connected to a downstream port of the hub 604, thereby constituting a USB bus topology as shown in FIG. 7.

Figure 7:
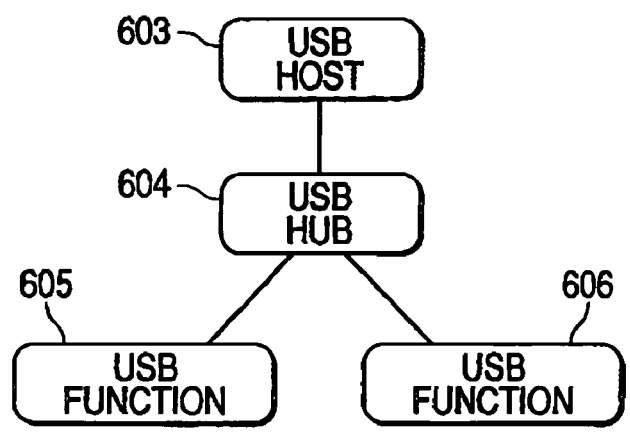
FIG. 7 is a view showing the bus topology in the connection form of direct printer-digital camera which the present inventor has devised.
Figure 8:
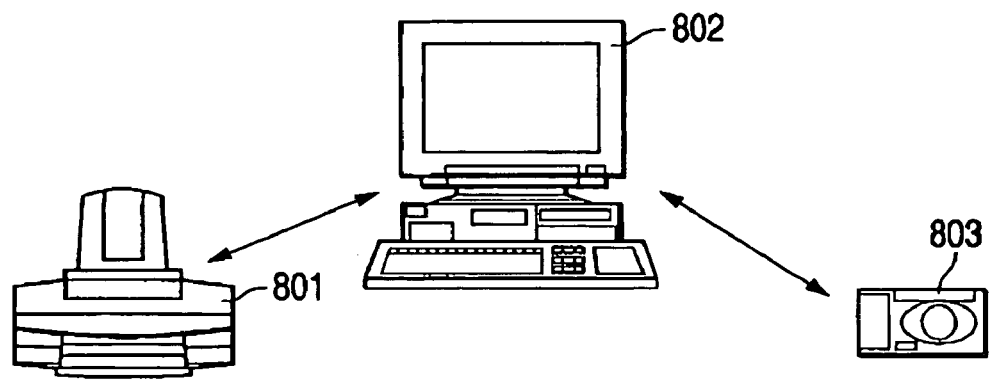
FIG. 8 is a view showing a conventional example of a data transfer system connecting a PC and printer.

When direct printing is performed from the digital camera 602 to the direct printer 601, the USB host 603 of the direct printer 601, in the USB topology of FIG. 7, requests the USB function 606 of the digital camera 602 for a data transfer so as to take in the image data on the memory card, and thereafter the USB host 603 automatically transfers the data to the USB function 605 via the hub 604 to execute printing.

Furthermore, it is needless to mention that the present invention is achieved by such a manner that a system or device is provided with a storage medium storing a program code of software which enables the function of the embodiment described above and a computer (or a CPU or MPU) of the system or device reads and executes the program code stored in the storage medium.

In this case, the program code read from the storage medium itself achieves the function of the embodiment described above, and the storage medium storing the program code and the program code constitutes the present invention.

It is possible to use a flexible disk, a hard disk, an optical disk, a magnetic optical disk, a CD-ROM, a CD-R, a magnetic tape, a nonvolatile memory card or a ROM, for example, as the storage medium for providing the program code.

Furthermore, it is needless to mention that the function of the embodiment described above is achieved by executing the program code read by the computer, but such a case is also included that, in accordance with the instruction of the program code, an OS (operating system) or the like operating on the computer performs part or all of the actual processing, and by means of which processing the function of the embodiment described above is achieved.

Furthermore, it is needless to mention that such a case is also included that after the program code read from the storage medium is written in a memory involved in an extended function board inserted into the computer or a function extending unit connected to the computer, a CPU or the like involved in the extended function board or function extending unit performs, in accordance with the instruction of the program code, part or all of the actual processing, and by means of which processing the function of the embodiment described above is achieved.

As apparent from the above description, according to the present invention, the data transfer can be performed even between different topologies while the form in which first and second external devices are connected to a data transfer device is maintained. Thus, the data obtained from the first and second external devices can both be output, and the data obtained from the second external device can be transferred to the first external device via the present data transfer device.

The present invention is not limited to the embodiment described above, and various modifications may be aimed within the scope specified in claims.

What is claimed is:

1. A communication apparatus for communicating data between separate topologies, said apparatus comprising:
a first communication interface which forms a first topology with a first external device;
a second communication interface which forms a second topology with a second external device;
an internal device for performing a predetermined function;
a first virtual device, in the first topology, corresponding to said internal device; and
a second virtual device, in the first topology, corresponding to the second external device,
wherein the first external device communicates with said internal device through said first virtual device, the first external device communicates with the second external device through said second virtual device, and the second external device communicates with said internal device directly through said second communication interface.

2. A communication apparatus according to claim 1, wherein each of the topologies has one host function, and in the first topology a host function of the first external device can transmit data specifying said internal device and the second external device.

3. A communication apparatus according to claim 1, wherein for transferring data from the second external device to the first external device, a data transfer request to said second virtual device is received from the first external device, and as a response to the data transfer request, a data transfer permitting signal is transmitted to the first external device, in response to data to be transferred from the second external device having been stored in an internal memory.

4. A communication apparatus according to claim 1, wherein the topologies indicate network constitution of USB devices.

5. A communication apparatus according to claim 1, further comprising converting means for converting information which designates the second device in the first topology into information which designates the second external device in the second topology.

6. A communication apparatus according to claim 1, wherein said communication apparatus is incorporated in a printer and said internal device performs printing functions.

7. A communication apparatus according to claim 1, wherein the first external device comprises a host computer.

8. A communication apparatus according to claim 1, wherein the second external device comprises a camera.

9. A communication method for communicating data between separate topologies, said method comprising the steps of:
forming a first topology with a first external device through a first communication interface;

forming a second topology with a second external device through a second communication interface;

providing an internal device for performing a predetermined function, a first virtual device, in the first topology, corresponding to the internal device, and a second virtual device, in the first topology, corresponding to the second external device; and effecting communication between the first external device and the internal device through the first virtual device, between the first external device and the second external device through the second virtual device, and between the second external device and the internal device directly through the second communication interface.

10. A communication method according to claim 9, wherein each of the topologies has one host function, and in the first topology a host function of the first external device can transmit data specifying the internal device and the second external device.

11. A communication method according to claim 9, further comprising the steps of transferring data from the second external device to the first external device, sending a data transfer request to the second virtual device from the first external device, and as a response to the data transfer request, transmitting a data transfer permitting signal to the first external device, in response to data to be transferred from the second external device having been stored in an internal memory.

12. A communication method according to claim 9, wherein the topologies indicate network constitution of USB devices.

13. A communication method according to claim 9, further comprising the step of converting information which designates the second external device in the first topology into information which designates the second external device in the second topology.

14. A communication method according to claim 9, wherein the internal device performs printing functions.

15. A communication method according to claim 9, wherein the first external device comprises a host computer.

16. A communication method according to claim 9, wherein the second external device comprises a camera.

17. A computer-readable program embodied on a computer-readable medium, the program for executing a communication method for communicating data between separate topologies, said method comprising the steps of:

forming a first topology with a first external device through a first communication interface;

forming a second topology with a second external device through a second communication interface;

providing an internal device for performing a predetermined function, a first virtual device, in the first topology, corresponding to the internal device, and a second virtual device, in the first topology, corresponding to the second external device; and effecting communication between the first external device and the internal device through the first virtual device, between the first external device and the second external device through the second virtual device, and between the second external device and the internal device directly through the second communication interface.

18. A storage medium containing a program for executing a communication method for communicating data between separate topologies, said method comprising the steps of:

forming a first topology with a first external device through a first communication interface;

forming a second topology with a second external device through a second communication interface;

providing an internal device for performing a predetermined function, a first virtual device, in the first topology, corresponding to the internal device, and a second virtual device, in the first topology, corresponding to the second external device; and effecting communication between the first external device and the internal device through the first virtual device, between the first external device and the second external device through the second virtual device, and between the second external device and the internal device directly through the second communication interface.

* * * * *

UNITED STATES PATENT AND TRADEMARK OFFICE
CERTIFICATE OF CORRECTION

| | | |
|---|---|---|
| PATENT NO. | : 7,200,685 B2 | Page 1 of 1 |
| APPLICATION NO. | : 10/411324 | |
| DATED | : April 3, 2007 | |
| INVENTOR(S) | : Uemura | |

It is certified that error appears in the above-identified patent and that said Letters Patent is hereby corrected as shown below:

ON THE TITLE PAGE:
At Item (54), "TOPLOGIES," should read --TOPOLOGIES,--.

COLUMN 1:
Line 3, "TOPLOGIES," should read --TOPOLOGIES,--.

Signed and Sealed this

Third Day of March, 2009

JOHN DOLL
*Acting Director of the United States Patent and Trademark Office*